United States Patent

[11] 3,549,812

[72] Inventors Takahiro Yui
Tokyo;
Chikai Ii, Masanori Funakoshi, Hirotaka Usuda, Yokohama, Makoto Hisamura, Kenagawa-ken, and Hidemasa Suzuki, Yokohama, Japan
[21] Appl. No. 693,888
[22] Filed Dec. 27, 1967
[45] Patented Dec. 22, 1970
[73] Assignees Hitachi Ltd.
Tokyo, Japan
a corporation of Japan;
Nippon Telegraph and Telephone Public Corporation
Tokyo, Japan, a corporation of Japan
[32] Priority Dec. 28, 1966
[33] Japan
[31] No. 41/85297

[54] COMMON CONTROL SWITCHING SYSTEM WITH REGISTER SENDER PROVIDING REDUCED BLOCKING RATE BY TWO-STAGE SCAN OF MARKER
3 Claims, 3 Drawing Figs.

[52] U.S. Cl. .......... 179/18
[51] Int. Cl. .......... H04q 3/48
[50] Field of Search .......... 179/18Reg, 18.211

[56] References Cited
UNITED STATES PATENTS
3,445,605 5/1969 Shirasu et al. .......... 179/18(Reg)

*Primary Examiner*—Kathleen H. Claffy
*Assistant Examiner*—Thomas W. Brown
*Attorney*—Craig, Antonelli, Stewart & Hill

ABSTRACT: A channel-matching system for an automatic switching apparatus of the common control type having a marker and a combined register and sender in which the marker is actuated in two stages, that is, before and after the register sender receives all the digits of a dialed number. By the two-stage actuation of the marker, the high link-blocking rate inherent in the switching apparatus of the above kind can be reduced to a degree comparable with the link blocking rate in a switching apparatus in which a register and a sender are separately provided.

Figure 1:
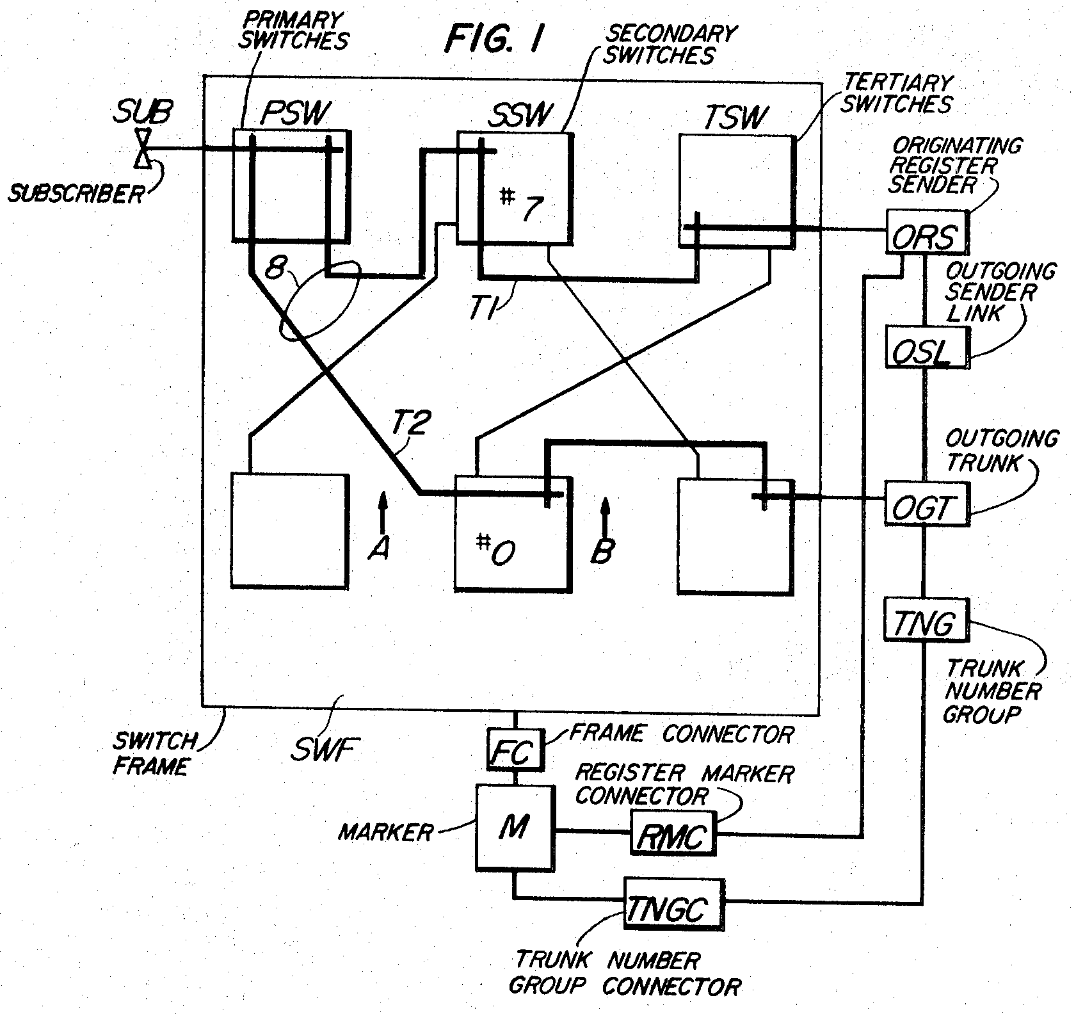

INVENTORS
TAKAHIRO YUI, CHIKAI II,
MANSANORI FUNAKOSHI, HIROTAKA USUDA
AND MAKOTO HISAMURA-HIDEMASA SUZUKI

BY Craig & Antonelli
ATTORNEYS

INVENTORS
TAKAHIRO YUI - CHIKAI II
MASANORI FUNAKOSH - HIROTAKA USUDA
MAKOTO HISAMURA - HIDEMASA SUZUKI

BY Craig & Antonelli

ATTORNEYS

INVENTORS
TAKAHIRO YUI - CHIKAI II
MASANORI FUNAKOSH - HIROTAKA USUDA
MAKOTO HISAMURA - HIDEMASA SUZUKI

BY Craig & Antonelli
ATTORNEYS

COMMON CONTROL SWITCHING SYSTEM WITH REGISTER SENDER PROVIDING REDUCED BLOCKING RATE BY TWO-STAGE SCAN OF MARKER

This invention relates to automatic-switching apparatus of the common control type employing therein a combined register and sender and more particularly to a channel-matching system for an automatic-switching apparatus.

An objectionable increase in internal blocking or link-blocking rate has been a major defect in an automatic-switching apparatus of the common control type employing therein a combined register and sender.

It is the primary object of the present invention to provide a novel and improved channel-matching system for an automatic-switching apparatus in order to thereby remedy an objectionable increase in the link-blocking rate which arises from the employment of the combined register and sender.

The above and other objects, advantages and features of the present invention will become apparent from the following description with reference to the accompanying drawings.

Figure 2A:
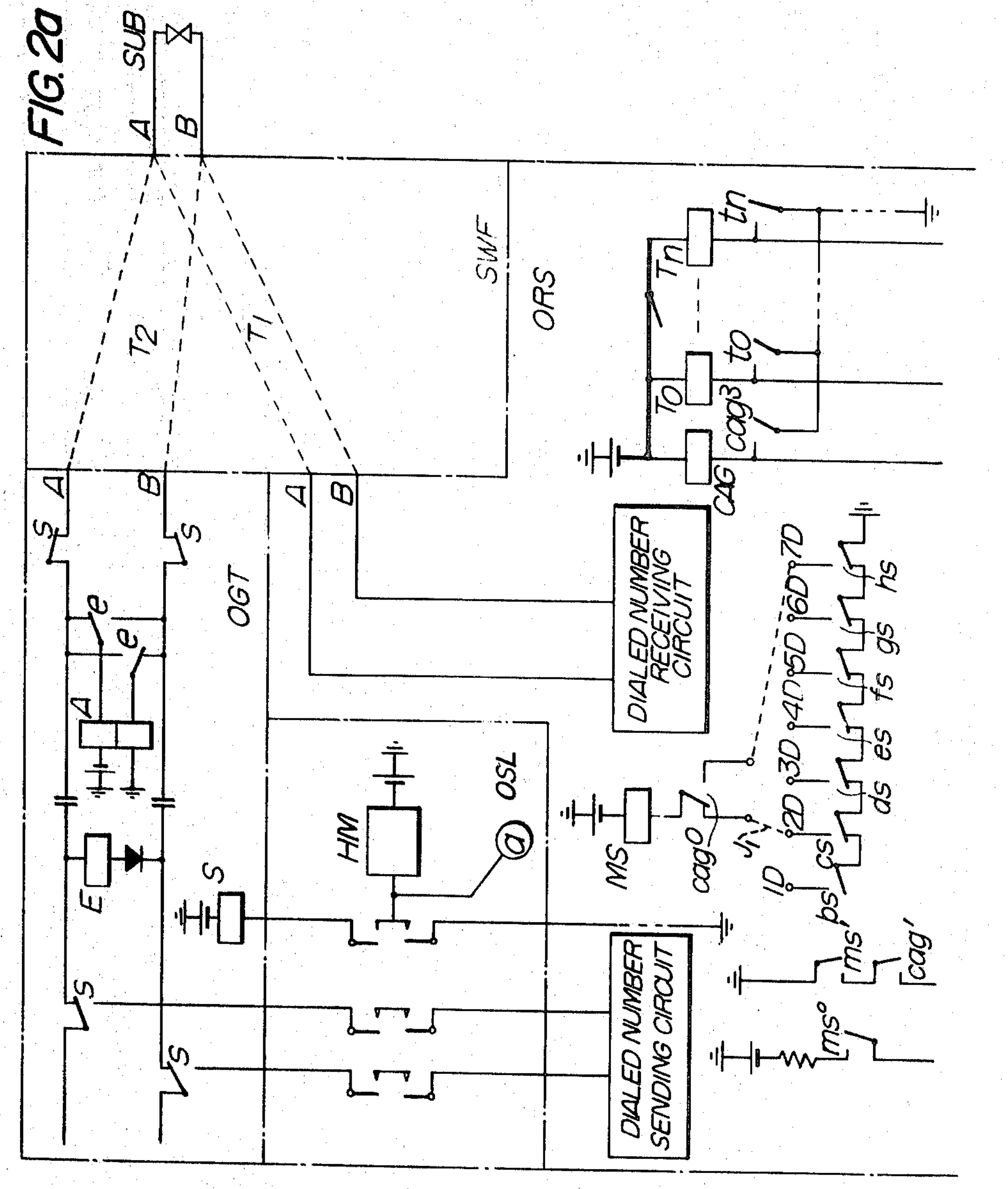
Figure 2B:
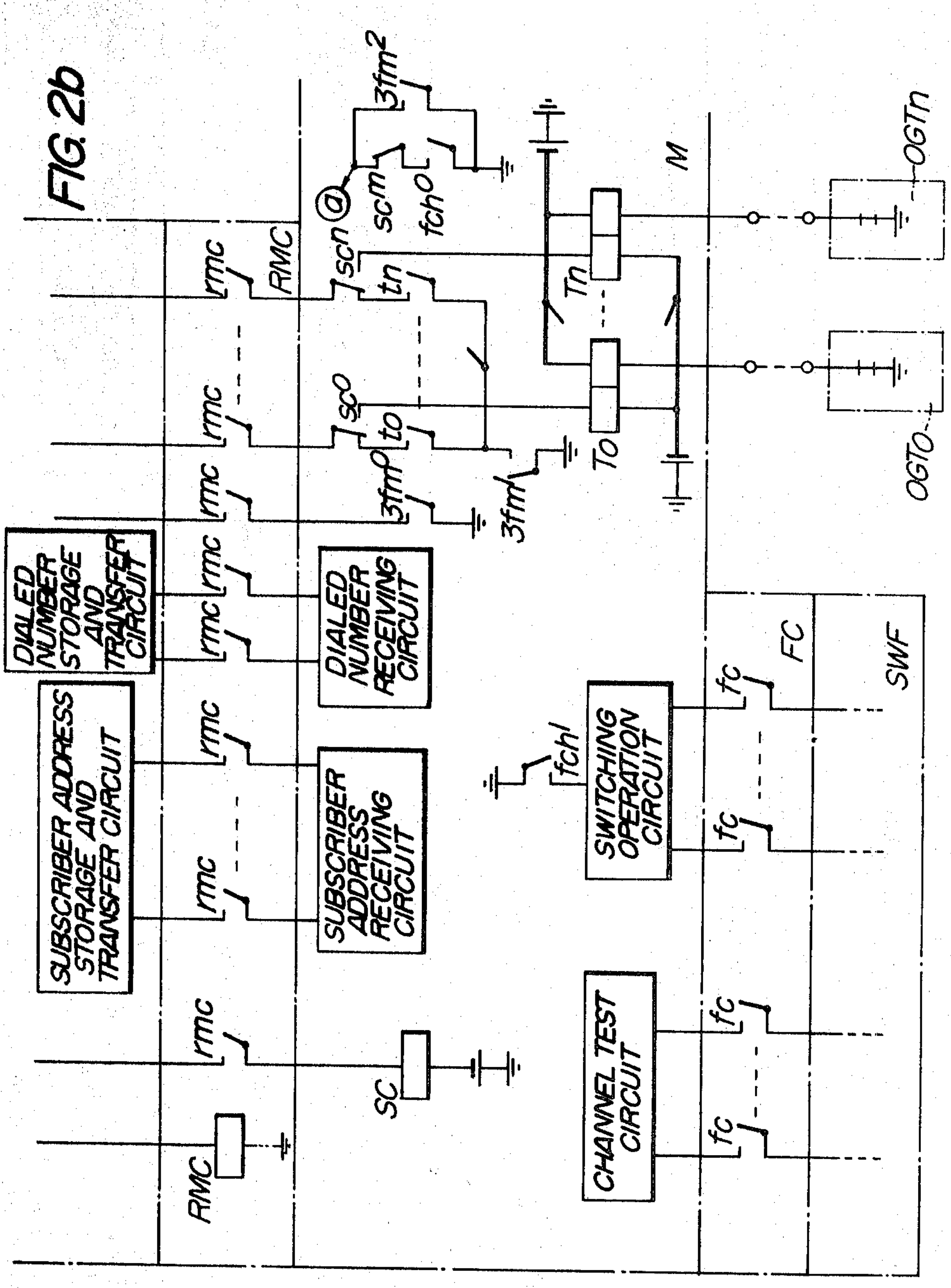

In the drawings:

FIG. 1 is a trunking diagram illustrating an automatic-switching apparatus of the common control type employing therein a combined register and sender to which the channel-matching system embodying the present invention is applied; FIGS. 2*a* and 2*b* are circuit diagrams embodying the present invention.

A channel-matching system heretofore employed for an automatic-switching apparatus of this kind will first be described with reference to FIG. 1 so that the present invention can more clearly be understood.

The automatic-switching apparatus of the common control type under consideration includes a switch frame SWF consisting of primary switches PSW, secondary switches SSW, tertiary switches TSW, primary links A connecting the primary switches PSW with the secondary switches SSW, and secondary links B connecting the secondary switches SSW with the tertiary switches TSW, subscribers SUB (here only one is shown) accommodated in the primary switches PSW, an originating register sender ORS, outgoing sender links OSL, outgoing trunks OGT, a register marker connector RMC, a marker M, a frame connector FC, a trunk number group TNG, and a trunk number group connector TNGC.

Suppose now that each of the primary switches PSW No. 0 to No. 7 is connected by one primary link A with the secondary switches SSW No. 0 to No. 7 so as to constitute a so-called single link connection and thus eight primary links A are accommodated in each primary switch PSW. Suppose further that the subscriber SUB shown in the FIG. 1 lifts the hand set, and as a result, the subscriber SUB Is connected with the originating register sender ORS by way of a channel T1 (hereinafter to be referred to as a register sender train) shown by thick solid lines.

When the calling subscriber SUB dials a number in order to make an outgoing call, the originating register sender ORS receives the dialed number. Upon receiving those digits of the dialed number which are required for route determination, the originating register sender ORS actuates the marker M through the register marker connector RMC. The actuated marker M selects and seizes an idle and available outgoing trunk OGT on the specified route and then makes such an operation which is called the channel-matching operation in which the marker M selects through the frame connector FC an idle and available channel to establish a connection between the subscriber SUB and the seized outgoing trunk OGT. According to a first method employed heretofore, the marker M, when it fails to attain a first channel matching, selects and seizes another idle and available outgoing trunk OGT trying to search a channel for a second channel matching. This operation is called a recycle of the marker and is employed in order to reduce the link-blocking rate in the case of the dial tone connection or outgoing connection. Usually, the marker M makes several recycles, and when the marker M is yet unsuccessful to attain the desired channel matching after several recycles, the particular call is blocked.

The link-blocking rate in the case of the first method will now be considered. During the channel-matching operation repeated several times as described above, the register sender train T1 is in use because of the fact that the originating register sender ORS stores therein the dialed number transmitted from the subscriber SUB. Accordingly, in order to attain the channel matching between the subscriber SUB and an outgoing trunk OGT, the marker operation for the channel matching must be made over all the channels minus one, that is, seven channels in the case shown in the FIG. In view of the above restriction, the link-blocking rate in the case of establishing an outgoing connection in the above structure is larger than the link-blocking rate encountered when the switching apparatus comprises an independent register and an independent sender, since in this latter case eight channels can be searched for the channel matching and one primary link can always be left in an idle and available state.

Assume that the primary links A have an efficiency $a$, the secondary links B have an efficiency $b$, and the number of channel matching operations is $s$. Then, the link blocking rate in the case of seven channels, and the link-blocking rate in the case of eight channels which necessarily include one idle and available primary link are respectively approximately given by the following equations:

$$B(1)=\{a+(1-a)b^{s}\}^{7} \qquad (1)$$

$$B(2)=\{a+(1-a)b^{s}\}^{7}b^{s} \qquad (2)$$

Since $0 \le a < 1$ and $0 < b < 1$, there is a relation, $B(1) > B(2)$ between the above two link-blocking rates. As will be apparent from the above relation, the link-blocking rate is greater in the case in which the combined register and sender is employed than in the case in which the register and the sender are separately provided. The switching apparatus employing the combined register and sender has thus been defective in respect to such a high link-blocking rate.

In a known second method, originating register sender ORS actuates marker M twice for a single outgoing connection; initially when the originating register sender ORS receives the digits of the dialed number which are necessary for determining the route and secondly, when the originating register sender ORS has received all of the digits of the dialed number. When the marker is actuatedfor the first time by outgoing register sender ORS, it selects one of the outgoing trunks OGT and connects the trunk with the outgoing register sender ORS through outgoing sender link OSL. In this case, no channel matching between the calling subscriber SUB and outgoing trunk OGT occurs. The originating register sender ORS is operative, on one hand, to transfer a few digits of the dialed number to another office by way of a path comprising the originating register sender ORS—outgoing sender link OSL-—outgoing trunk OGT, and on the other hand, to continue to receive the remaining digits of the dialed number through the register sender train T1. Upon receiving the last digit of the dialed number, the originating register sender ORS actuates the marker M again. After identifying the address of the outgoing trunk OGT in the switching frame SWF through the trunk number group TNG and the trunk number group connector TNGC, the marker M releases the register sender train T1 and searches a channel for the channel matching between the calling subscriber SUB and the outgoing trunk OGT which has been connected with the outgoing sender link OSL. According to the second method, one of the primary links A can necessarily be left in an idle and available state, but there is definitely a 1 : 1 relation between the subscriber SUB and a particular outgoing trunk OGT, and the marker M cannot make its recycling operation. The link blocking rate in this case can be calculated by substituting $S = 1$ for $S$ in Equation (2) and is approximately given by $$B(3)=\{a+(1-a)b\}^{7}b \qquad (3)$$

Since $0 < b < 1$, there is apparently a relation, $B(3) > B(2)$ between the two link-blocking rates sought by Equations (2) and (3).

The present invention contemplates the provision of a novel and improved channel matching system for an automatic-switching apparatus of the common control-type employing a combined register and sender so as to improve the high link-blocking rate previously encountered in the case of an outgoing connection and to realize an improved link-blocking rate whose value is substantially comparable with the value of the link-blocking rate obtained in the case in which the register and the sender are separately provided. The present invention will now be described in detail with reference to FIG. 1.

In the channel-matching system according to the present invention, the originating register sender ORS, after receiving those digits of a dialed number which are necessary for route determination, actuates the marker M through the register marker connector RMC. The marker M selects and seizes an idle and available outgoing trunk OGT, and searches for an idle and available channel within seven channels, that is, eight channels minus one channel which is the register sender train T1 in order to attain the channel matching between the subscriber SUB and the seized idle and available trunk OGT. Whenever marker M fails to attain the desired channel matching, the marker M selects and seizes another idle and available outgoing trunk OGT in an attempt to search for another channel for the channel matching. If, however, channel matching is successful, a connection path comprising the originating register sender ORS—outgoing sender link OSL—outgoing trunk OGT, and a connection path or an outgoing trunk train T2 comprising the subscriber SUB—switch frame SWF—outgoing trunk OGT are established under control of the marker M, and thus the originating register sender ORS and the outgoing trunk OGT are both connected to the subscriber SUB through one of the primary switches PSW. Under such a state of connection, the originating register sender ORS receives the remaining digits of the dialed number sent from the subscriber SUB and transmits these digits of the dialed number to another office. At the completion of transmission of all the digits of the dialed number, the originating register sender ORS releases the register sender train T1 and releases itself.

When the desired channel matching is still unsuccessful even after a predetermined number of marker recycles, the marker M establishes solely a connection path comprising the originating register sender ORS—outgoing sender link OSL—outgoing trunk OGT, and then sends to the originating register sender ORS such information as information telling the incompletion of the outgoing trunk train T2, or information calling for reactuation of the marker M, and if so required, a part of or the whole of the information identifying the address of the outgoing trunk OGT in the switch frame SWF. After sending out the above information, the marker M releases itself. The outgoing trunk OGT connected with the originating register sender ORS in this case may be the one which is selected in the last recycle for the channel matching, or where there is another idle and available outgoing trunk belonging to a different channel, such an outgoing trunk may be connected with the originating register sender ORS. In this respect, the latter outgoing trunk is preferred since the probability of link blocking in the subsequent channel-matching operation will be lower in the latter case than in the former case. This is because it is considered that talking time is generally in the order of 100 seconds, and a channel once placed in its link-blocked state has a high probability of remaining in the blocked state even after a length of time in the order of 10 seconds has elapsed.

After receiving all the digits of the dialed number, the originating register sender ORS actuates the marker M again. Upon receiving from the originating register sender ORS the information indicating the incompletion of the outgoing trunk train T2 or the information indicating the completion of reception of all the digits, the marker M detects the incompletion of the outgoing trunk train T2 and reads out the address of the outgoing trunk OGT in the switch frame SWF from the contents of the memory in the originating register sender ORS or by way of a path comprising the marker M—register marker connector RMC—originating register sender ORS—outgoing sender link OSL—outgoing trunk OGT—trunk number group TNG—trunk number group connector TNGC—marker M. The marker M then establishes a connection path comprising the subscriber SUB—switch frame SWF outgoing trunk OGT, that is, the outgoing trunk train T2 on the basis of the information indicating the address of the subscriber SUB which is sent out of the originating register sender ORS. Since, in this case, the register sender train T1 has been released prior to the channel matching operation by the marker M, eight channels including one primary link which is necessarily left in an idle and available state can be searched by the marker M for the sake of channel matching.

The link-blocking rate when the marker M is actuated two times for the channel matching in the above manner, that is, before reception of all the digits of a dialed number and after the completion of reception of all the pulses can be approximately calculated by $$B(4)=\{a+(1-a)b^8\}^7 b \qquad (4)$$

Equation (4) is a fair approximation which is applicable to such a case that the chance of channel matching is sought $s$-1 times over seven channels and the desired channel matching is attained at the $s$ trial with one of the primary links A necessarily placed in an idle and available state. It is thus apparent that there is a relation B(2) < B(4) < B(1) or B(3) among the link-blocking rates referred to in the above.

An embodiment of the present invention will be described with reference to FIGS. 2*a* and 2*b*, in which like reference characters are used to denote like parts in the switching apparatus shown in FIG. 1. A number dialed by a subscriber SUB is sent through lines A and B to be received by a receiving circuit in an originating register sender ORS. After receiving two digits of the dialed number, a steering relay CS (not shown) is energized. The energization of the steering relay CS energizes a marker start relay MS since the latter is connected to the ground through a jumper J. As a result, a contact $ms^{o}$ of the relay MS actuates a register marker connector RMC. When the register marker connector RMC is actuated or closed, the received two digits are transferred to a marker M, and in accordance with this information, the marker M selects a suitable outgoing trunk OGT. Relays To to Tn corresponding to idle and available outgoing trunks OGT*o* OGT*n* are energized so that the marker M can detect the address of the idle and available outgoing trunks OGT. Simultaneously with the reception of the dialed number, the address of the subscriber SUB in the switch frame SWF is also transferred to the marker M through the register marker connector RMC, and the marker M, thus detecting the addresses of the subscriber SUB and the outgoing trunks OGT, starts its operation for channel matching. A relay FCH (not shown) is energized as soon as an idle and available channel is found, and the relay FCH actuates an outgoing sender link OSL in order to connect the particular outgoing trunk OGT with the originating register sender ORS and at the same time to close the switching operation circuit and to establish a talking path through the switch frame SWF. In the meantime, the number of channel matching operations is counted by relays FM (not shown). When the third operation for the channel matching is unsuccessful, a relay 3FM is energized so that its contact $3fm$ energized a relay CAG and one of the relays To to Tn in the originating register sender ORS corresponding to the selected outgoing trunk OGT. The energization of the relay CAG releases the relay MS and subsequently releases the register marker connector RMC. On the other hand, a contact $3fm^2$ of the relay 3FM actuates an outgoing sender link OSL, which therefore connects the originating register sender ORS with the outgoing trunk OGT. Thus, the originating register sender ORS, while receiving the dialed number sent from the subscriber SUB through the switch frame SWF, sends out the dialed number by way of the outgoing trunk OGT. After the whole number has been received by the originating register sender ORS, a steering relay HS (not shown) is energized with the result that the marker start relay MS is energized again. Since the relay CAG has been urged to its energized state in the first marker-seizing operation and the marker- starting circuit has been switched over, the relay MS is energized by a circuit which is traced from the relay MS through a contact *hs* of the relay HS to the ground, so that the marker M is actuated for the second operation. A relay SC in the marker M which is actuated to make the second operation indicates that the marker M is actuated for the second operation. Contacts $sc^o$ to $sc^n$ of the relay SC connect the trunk address information receiving relays To to Tn with the originating register sender ORS, and the relay T in the marker M corresponding to the relay T in the register sender ORS which has been energized in the first marker-seizing operation is thereby energized. The marker M can thus detect the address of the outgoing trunk OGT and can make the desired channel matching between the calling subscriber SUB and the outgoing trunk OGT. In the second marker-seizing operation, no control is applied to the outgoing sender links OSL and the switch frame SWF is solely placed under control.

From the foregoing description, it will be appreciated that the channel matching and connection control system according to the present invention can easily remedy the objectionable increase in the link-blocking rate priorly encountered in an automatic-switching apparatus of the common control type employing a combined register and sender therein.

We claim:

1. An automatic telephone-switching system of the common control type which includes a switch frame having a plurality of lines therein for connecting a subscriber with an outgoing trunk, an originating register sender for receiving called party address information through a first line within said switch frame, an outgoing sender link connecting said register sender with said outgoing trunk and a marker for establishing a communication path between said subscriber and an outgoing trunk, comprising means responsive to less than the total amount of party address information identifying the address of a called party for causing said marker to repeatedly scan said plurality of lines for a predetermined number of scans, in order to establish a communication path between said subscriber and said outgoing trunk and means, responsive to the failure of said marker to establish a communication path between said subscriber and said outgoing trunk after a predetermined number of scans, for connecting said marker to another outgoing trunk different from said first outgoing trunk and for connecting said another outgoing trunk to said register sender through said outgoing sender link and for causing said marker to rescan said plurality of lines in order to establish a communication path between said subscriber and said another outgoing trunk.

2. An automatic telephone-switching system according to claim 1, further including means responsive to the receipt of the total amount of party address information identifying said address of said called party by said register sender for releasing the connection between said subscriber and said originating register sender through said first line within said switch frame, whereupon said plurality of lines scanned by said marker have said first line available for establishing a communication path between said subscriber and said another outgoing trunk.

3. An automatic telephone-switching system according to claim 2, wherein said party address information comprises a predetermined number of digits and wherein said means responsive to the receipt of the total amount of information identifying said address includes a counter for counting said predetermined number of digits.